US009203468B2

(12) United States Patent
Le Pera et al.

(10) Patent No.: US 9,203,468 B2
(45) Date of Patent: Dec. 1, 2015

(54) METHOD FOR ESTABLISHING RADIOFREQUENCY LINKS

(71) Applicant: EUTELSAT S A, Paris (FR)

(72) Inventors: Alessandro Le Pera, Issy-les-Moulineaux (FR); Daniele Vito Finocchiaro, Paris (FR); Antonio Arcidiacono, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 14/676,092

(22) Filed: Apr. 1, 2015

(65) Prior Publication Data

US 2015/0280776 A1   Oct. 1, 2015

(30) Foreign Application Priority Data

Apr. 1, 2014   (FR) ...................................... 14 52860

(51) Int. Cl.
*H04B 1/00* (2006.01)
*H04B 1/7103* (2011.01)
*H04B 7/185* (2006.01)
*H04W 72/04* (2009.01)

(52) U.S. Cl.
CPC .......... *H04B 1/7103* (2013.01); *H04B 7/18523* (2013.01); *H04B 7/18582* (2013.01); *H04W 72/0453* (2013.01); *H04B 2201/709709* (2013.01)

(58) Field of Classification Search
None
See application file for complete search history.

(56) References Cited

U.S. PATENT DOCUMENTS

| 5,625,640 | A   | * | 4/1997  | Palmer et al. ................. 375/132 |
|-----------|-----|---|---------|----------------------------------------|
| 5,678,175 | A   | * | 10/1997 | Stuart et al. .................. 455/13.1 |
| 6,011,952 | A   | * | 1/2000  | Dankberg et al. ............... 455/24 |
| 2003/0025641 | A1 | * | 2/2003 | Tits .............................. 343/786 |
| 2004/0166800 | A1 | * | 8/2004 | Sun .............................. 455/12.1 |
| 2010/0054131 | A1 | * | 3/2010 | del Rio Herrero et al. ... 370/236 |
| 2011/0176603 | A1 | * | 7/2011 | Beeler et al. ............ 375/240.02 |
| 2011/0255463 | A1 | * | 10/2011 | Roos et al. .................... 370/316 |
| 2012/0282854 | A1 | * | 11/2012 | Arcidiacono ................ 455/3.02 |
| 2013/0114644 | A1 | * | 5/2013  | Arcidiacono et al. ........ 375/145 |
| 2013/0336377 | A1 | * | 12/2013 | Liu et al. ...................... 375/232 |
| 2014/0301428 | A1 | * | 10/2014 | Arcidiacono et al. ........ 375/130 |

FOREIGN PATENT DOCUMENTS

| EP | 0 707 389 A2 | 4/1996 |
| WO | WO 03/103300 A2 | 12/2003 |
| WO | WO 2011/076791 A1 | 6/2011 |

OTHER PUBLICATIONS

Preliminary Search Report as issued in French Patent Application No. FR 1452860, dated Nov. 4, 2014.

* cited by examiner

*Primary Examiner* — Daniel Washburn
*Assistant Examiner* — Berhanu Tadese
(74) *Attorney, Agent, or Firm* — Pillsbury Winthrop Shaw Pittman LLP

(57) ABSTRACT

A method for establishing radiofrequency links by satellite also making it possible to assure the return link transmission of hyperfrequency radioelectrical signals in an efficient manner in terms of performances, easily adaptable to a pre-existing broadcasting system, using the same forward link and return link frequency band, enabling the use of two independent terrestrial stations for the two channels, and enabling operation of the amplification chain of the transponder of the satellite at saturation or close to saturation.

14 Claims, 2 Drawing Sheets

METHOD FOR ESTABLISHING RADIOFREQUENCY LINKS

CROSS REFERENCE TO RELATED APPLICATIONS

This application claims the benefit of priority from French Patent Application No. 1452860 filed on Apr. 1, 2014, the entire content of which is incorporated herein by reference.

FIELD

The present invention relates to a method for establishing radiofrequency links by satellite.

BACKGROUND

At present, the broadcasting of digital television programmes by satellite channel (for example according to one of the standards DVB-S, DVB-S2 or DVB-SH) is widely used throughout the world. Numerous devices are installed in millions of user's homes.

The installed devices are predominately reception devices which comprise an external unit including a parabolic reflector which focuses the modulated hyperfrequency signals, onto the source, called feedhorn, of an LNB (Low Noise Block), the LNB transforming the hyperfrequency signals received into electrical signals in intermediate satellite band in order to transmit them, via a coaxial cable, to the STB satellite decoder.

The decoder comprises a demodulation block (DVB-S, DVB-S2 or DVB-SH) which extracts a "useful" modulated signal in the modulated signal transmitted on the coaxial cable and demodulates the extracted "useful" signal. The "useful" demodulated signal may, for example, be used to display video images on a television screen.

Offers for broadcasting digital television programmes via terrestrial or satellite channel are today essentially purely passive, that is to "one-way service".

It may nevertheless prove to be interesting to be able to offer services requiring a return link; this is the case for example of interactive services (votes, consumption of contents with conditional access by exchange of keys, orders for new services such as video on demand). Moreover, this return link can find particularly interesting applications in the field of machine to machine (or M2M) communications for controlling certain devices (alarms, heating, etc.) and/or for recovering data measured by sensors or meters (gas, electricity, etc.) present within homes.

A known solution to this problem consists in using a return link employing an ADSL type connection supplied by fixed telephone operators (STN or "Switched Telephone Network") or a GPRS/UMTS type connection supplied by mobile telephone operators. This solution thus requires additional equipment as well as an additional subscription; furthermore, telephone switching is not particularly suited to the transmission of not very large messages such as vote or order messages (relatively high cost, problems of saturation of the network, etc.). Furthermore, such a solution is not entirely satisfactory in so far as the interactive functionalities are not based on the same type of installation and equipment already used for the reception of television by satellite.

Most satellite television offers do not include a return link. Interactivity by satellite may be offered as a system completely separate from the broadcasting system, but with quite high costs and not very compatible with a television offer. It is possible nevertheless to cite an example of two-way system for broadcasting television by satellite described in the patent application WO2011076791 filed by the applicant. In this system, the terminals are low cost and the interactive sub-system is integrated with the broadcasting sub-system. This system uses a forward link in wide Ku or Ka band and a return link for the terrestrial terminals in a band different to the Ku band, for example in narrow S band or in C band.

A return link in the Ku band could also be conceived, but in a portion of the Ku band that is not used by the forward link, so that the forward link is not scrambled by the signal in the return link.

It may nevertheless prove to be particularly interesting to use the same portion of band in forward link and in return link; such a configuration enables in fact better spectral efficiency and thus assures a reduction in terms of costs in so far as a same transponder may be used for the forward link and for the return link, without having need of a dedicated transponder for the return link.

Such a configuration is particularly described in the U.S. Pat. No. 6,011,952 in which a main terrestrial station transmits in forward link in a wide band whereas terminals transmit at lower power in return link in sub-bands separated from each other and present in the wide band used for the forward link. According to this configuration, the transmitting terrestrial station is also in charge of the elimination of the main signal transmitted by itself and the recovery of the signals transmitted by the terminals. The fact of using the same terrestrial station for the transmission of the main signal and the recovery of the signals in return link leads to a lack of flexibility of the overall architecture.

The elimination technique proposed in the document U.S. Pat. No. 6,011,952 assumes that the amplification of the signals at the level of the relay device (which may be the transponder of a satellite) is carried out with an amplification chain of the transponder operating uniquely in linear regime. Such an operation with exclusively linear effects thus implies that the amplification chain (including for example travelling wave tube amplifiers or TWTA) of the transponder cannot operate close to saturation or at saturation (situations in which non-linear effects appear). The use of an operation at saturation can however prove to be particularly interesting (or even indispensable) when broadcast type signals such as TV signals are transmitted. In fact, for an application such as television broadcasting, it is very important to minimise the size of the receiving antenna and to maximise the resistance to rain (given by the margin in the link budget). To obtain these effects, the satellite transponder must be used very close to saturation. For memory, the amplifiers used in satellite transponders have a non-linear behaviour when they are used with high power levels (power saturation). These non-linear effects can produce a distortion of the output signal, harmonic frequencies or intermodulation signals in the case of multi-carriers. In the linear domain of a travelling wave, the output power at the end of a tube is proportional to the input power. Saturation arises when the output power no longer increases linearly with the input power. In other words, the input power over output power characteristic, also designated by amplitude/amplitude (AM/AM) modulation is not linear when the output of the amplifier is maximum.

Apart from the effects of gain compression, power amplifiers also have non-linear amplitude/phase (AM/PM) modulation effects.

The saturation of the output power goes hand in hand with a change of phase of the wave. When one remains in the linear domain, the variation of the dephasing with the input power remains low, but when saturation is approached, thus the maximum power that the amplifier can supply, the two effects of AM/PM conversion ("AM/PM conversion"—kp) and AM/PM transfer ("AM/PM transfer"—kt) are going to manifest themselves.

The presence of these strong effects due to the saturation of the satellite transponder prevents the use of the elimination technique described in the document U.S. Pat. No. 6,011,952 in the context of a satellite television broadcasting system.

SUMMARY

In this context, an aspect of the present invention aims to provide a method for establishing radiofrequency links by satellite also making it possible to assure the return link transmission of hyperfrequency radioelectrical signals in an efficient manner in terms of performances, easily adaptable to a pre-existing broadcasting system, using the same forward link and return link frequency band, enabling the use of two independent terrestrial stations for the two channels, and enabling an operation of the amplification chain of the transponder of the satellite at saturation or close to saturation.

To this end, an embodiment of the invention proposes a method for establishing radiofrequency links in a telecommunication network comprising:
- a telecommunication satellite comprising a transponder for the reception of signals situated in a determined uplink frequency range within an uplink frequencies of use band (for example part of the Ku band dedicated to the uplink, called "Ku uplink"), the amplification of the signals, the frequency conversion of the signals and the transmission to the earth of the signals situated in a determined downlink frequency range within a downlink frequencies of use band (for example another part of the Ku band dedicated to the downlink, called "Ku downlink");
- a main terrestrial station comprising a broadcasting system to broadcast to the telecommunication satellite signals modulated according to a first protocol and occupying at least one portion of the uplink frequency range;
- a plurality of interactive terminals, each of the interactive terminals comprising a receiver to receive the signals transmitted by the transponder from the main terrestrial station, and a transmitter to transmit to the telecommunication satellite signals modulated according to a second protocol and occupying at least one part of the portion of the uplink frequency range, the second protocol being different to the first protocol and being a spread spectrum protocol;
- an interactive terrestrial station comprising a receiver to receive the signals transmitted by the transponder from the interactive terminals and from the main terrestrial station;

the method comprising the following steps:
- transmission by the main terrestrial station of a signal modulated according to the first protocol and occupying the portion of the uplink frequency range;
- transmission by the interactive terminals of a plurality of signals modulated according to the second protocol and occupying at least one part of the portion of the uplink frequency range such that the plurality of signals is frequency superimposed on the signal broadcast by the terrestrial station;
- reception by the satellite of the signals modulated according to the second protocol and of the signal modulated according to the first protocol, the signals modulated according to the second protocol being received by the telecommunication satellite with a total amplitude less than the amplitude of the signal broadcast by the main terrestrial station and the signals modulated according to the second protocol being received by the telecommunication satellite with different amplitudes;
- passage of the signals modulated according to the second protocol and of the signal modulated according to the first protocol within the transponder, all of the signals being amplified with non-linear effects by said transponder;
- transmission by the satellite to the earth of an aggregated signal comprising the signals modulated according to the second protocol and the signal modulated according to the first protocol amplified by the transponder;
- reception by the interactive terminals of the aggregated signal and demodulation of the signal transmitted by the main terrestrial station modulated according to the first protocol;
- reception by the interactive terrestrial station of the aggregated signal, designated initial aggregated signal;
- elimination, by the interactive terrestrial station, within the initial aggregated signal of the signal modulated according to the first protocol such that a reprocessed aggregate signal is obtained;

the method also comprising:
- a step i) of demodulation by the interactive terrestrial station, from the reprocessed aggregate signal, of the signals modulated according to the second protocol having the greatest amplitude among all of the signals modulated according to the second protocol present in the reprocessed aggregate signal;
- a step ii) of re-modulation according to the second protocol by the interactive terrestrial station of the signals demodulated at the preceding step;
- a step iii) of generation by the interactive terrestrial station of a signal including the signal modulated according to the first protocol and the signals re-modulated according to the second protocol to which are applied the linear and nonlinear effects of the amplification of the transponder;
- a step iv) of elimination within the initial aggregated signal of the signal simulated during the preceding step such that a new reprocessed aggregate signal is obtained the steps i) to iv) being reiterated on the new reprocessed aggregate signal, the level of interference within the reprocessed aggregate signal reducing at each iteration.

Thanks to an embodiment of the invention, beneficially a same frequency band (or part of frequency band) is used, for example and in a non-limiting manner a part of the Ku frequency band dedicated to the uplink, for transmitting broadcasting signals such as television signals in forward link dedicated to existing terminals and to adapted terminals (called interactive terminals), and signals transmitted in return link by the interactive terminals.

Beyond the use of a same band and unlike the configuration of the document of U.S. Pat. No. 6,011,952, here are used signals (both in forward link and in return link) superimposed on a same band (and not separated according to different frequency channels); to achieve this, the method uses two types of protocol, each protocol being defined by a modulation/demodulation technique and a particular encoding, for example a protocol based on a proven technology in forward link (based for example on a standard DVB-S, DVB-S2 or DVB-SH) and a protocol in return link based on a spread spectrum protocol, such as a multiple random access protocol with band spreading by modulation of the SPREAD ALOHA type using interference elimination techniques. Such a protocol is for example described in the document US2010/0054131 (del Rio Herrero et al.).

Another difference compared to the configuration of the document of U.S. Pat. No. 6,011,952 is that the interactive terminals do not all transmit with the same power such that the signals received by the interactive terrestrial station, although superimposed in a same frequency band, do not all have the same amplitude. Moreover, the main broadcasting signal has a greater amplitude than the cumulative amplitude of the signals transmitted by the interactive terminals. An aspect of the invention is based on a progressive elimination of the signals within the initial aggregated signal received by the interactive terrestrial station. Thus, one begins by detecting and eliminating the main broadcast signal; it is then possible to detect and eliminate the signals transmitted by the interactive terminals having the greatest amplitude and so on. At each iteration, new signals (with a smaller amplitude) become detectable because the level of interference has been reduced. A particularity of an embodiment of the invention consists in refining the elimination of all of the signals in the course of the method while particularly taking into account, in addition to the linear effects, the non-linear effects of the amplification chain on board the satellite. To do so, at each step of elimination one emulates, at the level of the interactive terrestrial station, an aggregated signal comprising all of the demodulated signals as well as the main signal while taking into account the non-linear effects (for example linked to AM/AM, AM/PM effects) and it is this new emulated signal that will be taken into account to carry out the elimination. It will easily be understood that the operation consisting in making all of the signals, and not each signal one after the other, pass into a simulator (simulating particularly the amplification on board the satellite) is going to make it possible to have an approach much closer to reality of the non-linear effects. Such an approach aiming to take into account the non-linear effects makes it possible to work at higher power at the level of the transponder (i.e. close to saturation or at saturation).

It will be noted that even if an embodiment of the invention can function with a main terrestrial station situated beside the interactive terrestrial station (they can even only constitute a single same station), it may be particularly interesting to have an interactive terrestrial station located at another place, the progressive recovery of the signals transmitted by the interactive terminals having no reason to take place at the same spot as the broadcasting of the broadcast signal.

The method according to an embodiment of the invention may also have one or more of the characteristics below, considered individually or according to all technically possible combinations thereof:
  the telecommunication network comprises a plurality of non-interactive, uniquely reception terminals, each of the non-interactive terminals comprising a receiver to receive the signals transmitted by the transponder from the main terrestrial station, the method comprising a step of reception by said non-interactive terminals of said aggregated signal and of demodulation of the signal transmitted by the main terrestrial station modulated according to the first protocol;
  certain of the non-interactive terminals were already installed and operational before the commissioning of the interactive terminals;
  the second protocol is an asynchronous or synchronous multiple random access protocol;
  the first protocol is implemented according to one of the following standards:
    DVB-S;
    DVB-S2;
    DVB-SH;
  the uplink frequencies of use band belongs to the Ku band or the Ka band;
  the main terrestrial station is located in a place different to the interactive terrestrial station;
  the effects of the amplification of the transponder of step iii) include one or more of the following effects:
    non-linear effect of the amplitude/amplitude AM/AM modulation;
    non-linear effect of the amplitude/phase AM/PM modulation;
    linear effect of the gain response as a function of the frequency for the signal modulated according to the first protocol;
    linear effect of the gain response as a function of the frequency for the signals modulated according to the second protocol;
  the method according to an embodiment of the invention comprises a step of sending by the main terrestrial station signalling information to the interactive terminals;
  the step of sending the signalling information consists in informing the terminals of a level or a range of transmission power levels to use;
  the iterative process stops when the number of iterations has reached a given threshold value or when a new iteration does not make it possible to detect and demodulate new signals within the reprocessed aggregate signal;
  the aggregated signal received is sampled, the samples being memorised in a memory space, and the operations of elimination of the detected and demodulated signals being carried out by modifying successively the content of the memory space at each stoppage of the iterative process;
  the step of elimination by the interactive terrestrial station of the signal modulated according to the first protocol comprises the following steps (these steps are particularly beneficial when the main terrestrial station is located in a place different to the interactive terrestrial station):
    a step of demodulation by the interactive terrestrial station, from the aggregated signal, of the signal modulated according to the first protocol;
    a step of re-modulation according to the first protocol by the interactive terrestrial station of the signal demodulated at the preceding step;
    a step of generation by the interactive terrestrial station of a signal including the signal re-modulated according to the first protocol to which are applied the linear and non-linear effects of the amplification of the transponder;
    a step of elimination within the initial aggregated signal of the signal simulated during the preceding step such that the reprocessed aggregate signal is obtained.

An aspect of the present invention also relates to a telecommunication network for the implementation of the method according to an embodiment of the invention comprising:
  a telecommunication satellite comprising a transponder for the reception of signals situated in a determined uplink frequency range within an uplink frequencies of use band, the amplification of the signals, the frequency conversion of the signals and the transmission to the earth of the signals situated in a determined downlink frequency range within a downlink frequencies of use band;
  a main terrestrial station comprising a broadcasting system to broadcast to the telecommunication satellite signals modulated according to a first protocol and occupying at least one portion of the uplink frequency range;

a plurality of interactive terminals, each of the interactive terminals comprising a receiver to receive the signals transmitted by the transponder from the main terrestrial station, and a transmitter to transmit to the telecommunication satellite signals modulated according to a second protocol and occupying at least one part of the portion of the uplink frequency range such that the plurality of signals is frequency superimposed on the signal broadcast by the terrestrial station, the second protocol being different to the first protocol and being a spread spectrum protocol, the signals modulated according to the second protocol being received by the telecommunication satellite with a total amplitude less than the amplitude of the signal broadcast by the main terrestrial station and the signals modulated according to the second protocol being received by the telecommunication satellite with different amplitudes;

an interactive terrestrial station comprising a receiver to receive the signals transmitted by the transponder from the interactive terminals and from the main terrestrial station;

wherein:

the satellite further comprises a transmitter to transmit to the earth of an aggregated signal comprising the signals modulated according to the second protocol and the signal modulated according to the first protocol amplified by the transponder;

the interactive terminals comprise a receiver to receive the aggregated signal and of demodulation of the signal transmitted by the main terrestrial station modulated according to the first protocol;

the interactive terrestrial station comprises:

a receiver to receive the aggregated signal, designated initial aggregated signal;

a processing device to eliminate within the initial aggregated signal of the signal modulated according to the first protocol such that a reprocessed aggregate signal is obtained;

demodulator to demodulate, from the reprocessed aggregate signal, of the signals modulated according to the second protocol having the greatest amplitude among all of the signals modulated according to the second protocol present in the reprocessed aggregate signal;

a re-modulation device to re-modulate according to the second protocol of the demodulated signals;

a signal generator to generate a signal including the signal modulated according to the first protocol and the signals re-modulated according to the second protocol to which are applied the linear and non-linear effects of the amplification of the transponder;

a processing device to eliminate within the initial aggregated signal of the simulated signal such that a new reprocessed aggregate signal is obtained.

BRIEF DESCRIPTION OF THE DRAWINGS

Other characteristics and benefits of the invention will become clear from the description that is given thereof below, by way of indication and in no way limiting, with reference to the appended figures, among which.

DETAILED DESCRIPTION

Figure 1:
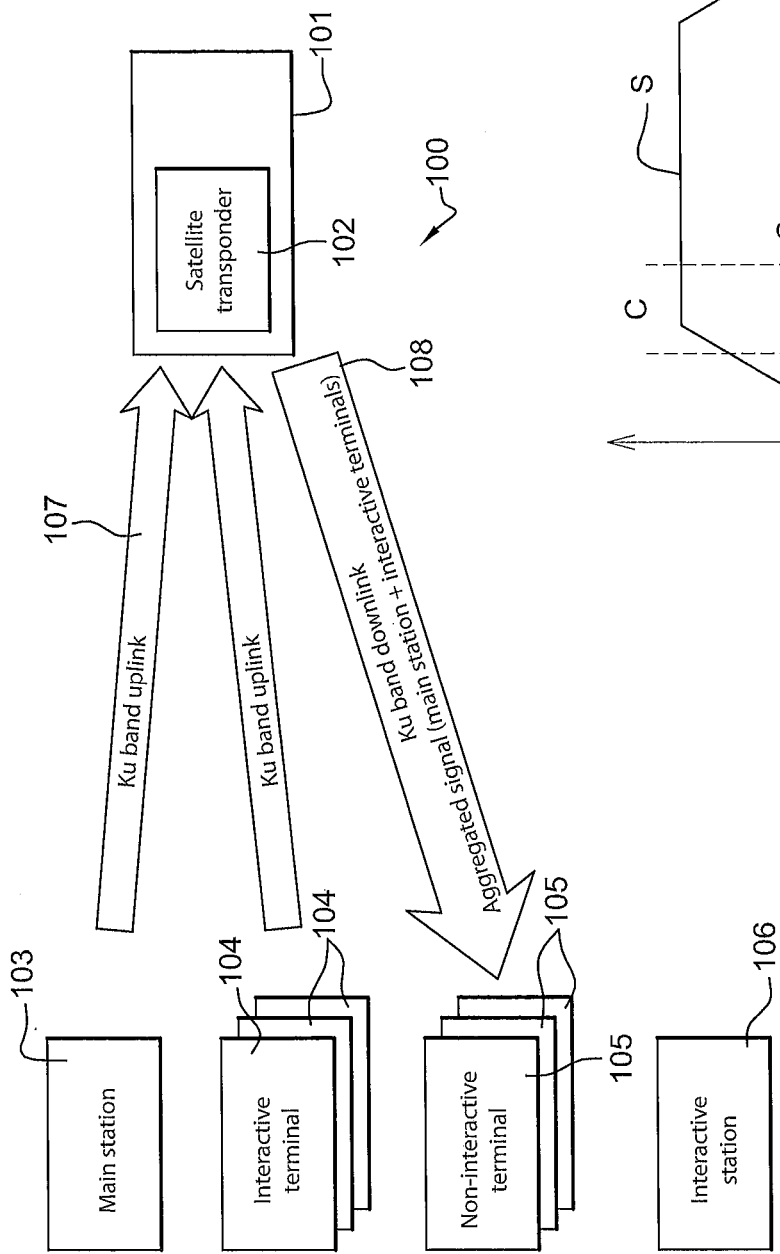
FIG. 1 schematically represents a telecommunication network for the implementation of the method according to an embodiment of the invention.
Figure 3:
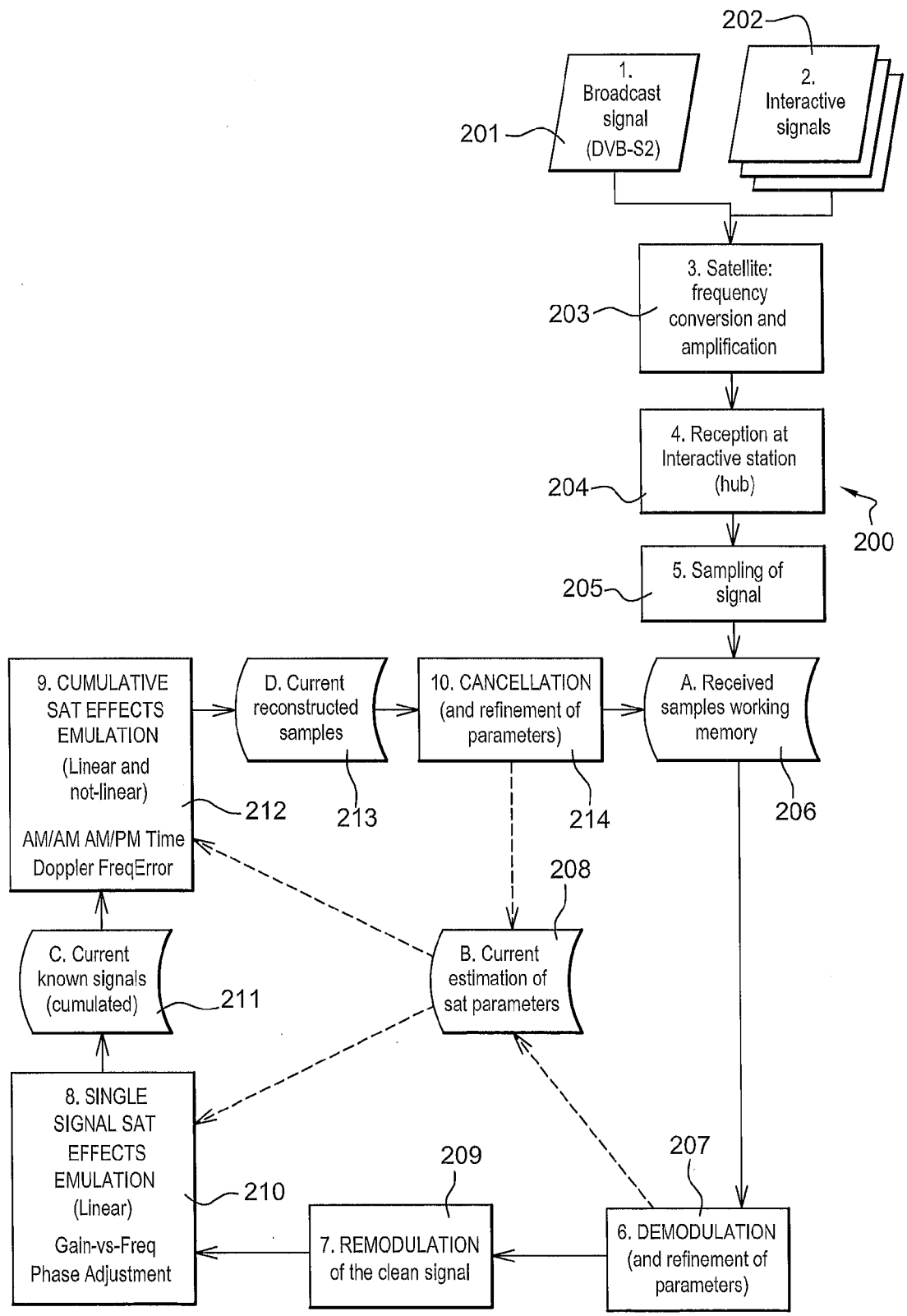
FIG. 3 illustrates the different steps of the method according to an embodiment of the invention.

FIG. 1 represents in a schematic manner a telecommunication network 100 according to an embodiment of the invention. In parallel, the main steps of the method 200 according to an embodiment of the invention (particularly the steps of processing at the level of the interactive terrestrial station 106) are illustrated in FIG. 3.

The telecommunication network 100 comprises:

a telecommunication satellite 101 comprising at least one transponder 102 (it being understood that the satellite generally comprises a plurality of transponders 102);

a main terrestrial station 103;

a plurality of interactive terminals 104;

a plurality of non-interactive, uniquely reception terminals 105;

an interactive terrestrial station 106.

It will be noted that one of the benefits of an embodiment of the invention is being able to adapt to an existing telecommunication network and including exclusively interactive terminals and including therein terminals including interactive means without perturbing the operation of the network and the reception of signals such as television signals by the non-interactive terminals.

The main terrestrial station is configured to broadcast (step 201), in uplink to the satellite 101, signals modulated according to a modulation using for example a protocol operating according to the standard DVB-S2 (ETSI EN 302 307 Digital Video Broadcasting (DVB); Second generation framing structure, channel coding and modulation systems for Broadcasting, Interactive Services, News Gathering and other broadband satellite applications (DVB-S2)).

Each transponder 102 of the satellite 101 is a transmitter/receiver that transmits signals automatically when it receives certain predetermined signals. The term "transponder" for a satellite is a signal processing unit which uses a single high power amplification chain. Each transponder processes a defined range of frequencies, also called "bandwidth", which can vary from several tens of MHz to several hundreds of MHz) centred on a given frequency and with a given polarisation of the signal received. The frequency range of the transponder lies within an uplink frequencies of use band 107 using a part dedicated to the uplink of the Ku band ("Ku uplink" which will be designated by the terminology uplink use band).

The signals transmitted by the main terrestrial station 103 are transmitted over a portion of the frequency range of the transponder 102. These signals are for example television signals.

Figure 2:
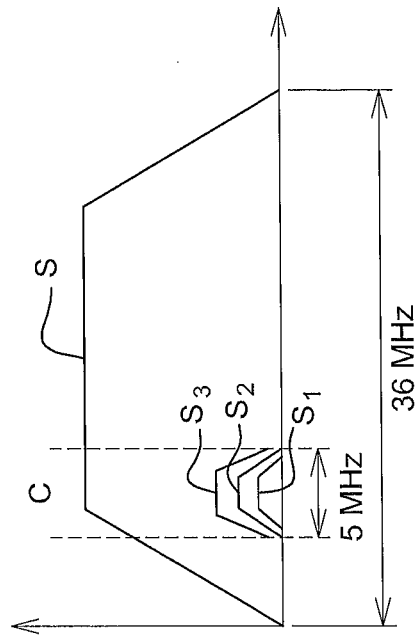
FIG. 2 schematically represents the frequency division of the signals transmitted by the main terrestrial station and by the interactive terminals in the method according to an embodiment of the invention.

Each transponder comprises a system for changing the frequency and potentially the polarisation and of amplifying the signals that it receives from the earth and a transmitter for re-transmitting them to the earth. A satellite comprises several transponders, each being able to support one or more communication channels. The transponders 102 are for example transponders having a band width of 36 MHz (i.e. the frequency range has a bandwidth of 36 MHz) able to process DVB-S2 signals on a main carrier of 36 MHz. By making the hypothesis that the signals transmitted by the main terrestrial station 103 occupy the whole frequency range of 36 MHz, such a signal S on a main carrier of 36 MHz is illustrated in FIG. 2.

The interactive terminals 104 comprise a transmitter to transmit, in uplink to the satellite 101, signals modulated by a modulator operating for example according to an asynchronous multiple random access protocol with band spreading by modulation of the SPREAD ALOHA type optimised so that the interactive terrestrial station 106 can use a device to eliminate interferences (such a protocol is for example described in the document US2010/0054131 (del Rio Herrero et al.). The signals transmitted by the interactive terminals 104 (step 202) are return link signals, for example return signals relating to interactive services linked to TV broadcasting (taking out a subscription, votes, consumption of contents with conditional access by exchange of keys, orders for new services such as video on demand).

These signals are transmitted on a C channel situated within the portion used for the broadcast signals and thus within the uplink frequency range of the transponder 102. The channel C illustrated in FIG. 2 has for example a width of 5 MHz. Several signals S1, S2 and S3 are represented in FIG. 2.

According to an embodiment of the invention, the sum of the amplitudes of the signals received from the interactive terminals 104 is less than the amplitude of the signal S received from the main terrestrial station 103. Moreover, according to an embodiment of the invention, it is advisable that the signals received from the interactive terminals 104 do not all have the same amplitude: thus, the signal S1 has a smaller amplitude than the signal S2 which itself has a smaller amplitude than the signal S3.

The signal S transmitted by the main terrestrial station 103 and the signals S1, S2, S3 transmitted by the interactive terminals 104 are received and processed by the transponder 102 dedicated to the corresponding frequency range; the transponder 102 is going to amplify the signals by its amplification chain including for example travelling wave tubes TWTA of an amplifier and frequency shift the signals (step 203). The aggregated signal thereby obtained (including all of the amplified and frequency shifted signals) is then retransmitted to the earth.

In order to transmit this aggregated signal to the earth, the transponder 102 uses for example a part 108 dedicated to the downlink of the Ku band ("Ku downlink" which will be designated by the terminology downlink frequencies of use band).

It will be noted that the amplification chain of the transponder 102 here operates at saturation or very close to saturation in order to transmit efficiently the broadcast type signals such as TV signals. In this configuration, as evoked above, the amplifiers used in the transponder 102 have a non-linear behaviour (i.e. the output power no longer increases linearly with the input power). Apart from the effects of gain compression (AM/AM), the amplifiers used in the transponder 102 also have non-linear amplitude/phase (AM/PM) modulation effects.

The aggregated signal transmitted to the earth by the transponder 102 is received by:
the interactive terminals 104;
the non-interactive terminals 105;
the interactive station 106.

The interactive 104 and non-interactive 105 terminals beneficially each comprise a demodulator of signals modulated according to the standard DVB-S2 such that each terminal can recover the television signal transmitted by the main station 103. The level of the signal transmitted by the main station 103, compared to the noise and at the aggregated power level of all the terminals, has in an embodiment a "signal to noise" ratio greater than the demodulation threshold required by the first modulation used (i.e. for example a modulation using a protocol operating according to the standard DVB-S2).

It will be noted that, according to the particularly embodiment described, the main terrestrial station 103 is different to the interactive terrestrial station 106. In fact, even if the invention can function with a main terrestrial station situated beside the interactive terrestrial station (they may even only constitute a single same station), it may be particularly interesting to have an interactive terrestrial station located at another place, the progressive recovery of the signals transmitted by the interactive terminals not having any reason to take place at the same spot as the broadcasting of the broadcast signal.

The steps 204 to 214 that follow are all carried out at the level of the interactive terrestrial station.

According to step 204 of the method according to an embodiment of the invention, the interactive terrestrial station 106 receives the aggregated signal broadcast by the satellite 101.

According to step 205, the interactive terrestrial station 106 comprises a sampler to temporarily sample the aggregated signal.

The samples of aggregated signal (for example relatively short samples over a sampling window of 400 ms) are saved in a working memory A (step 206).

According to step 207, the interactive terrestrial station 106 then demodulates within the working memory A, the first detectable and de-modulable signal; in the case in point, during the first iteration; this first detectable and de-modulable signal is the DVB-S2 signal transmitted by the main terrestrial station 103 (cf. signal S of FIG. 2). This first step implies that the interactive terrestrial station 106 is equipped with a DVB-S2 modulator/demodulator. During the next iterations, this step 207 will be carried out on the signals transmitted by the interactive terminals 104, firstly on the signals having the greatest amplitude then, during following iterations, on signals having smaller amplitudes (with reference to FIG. 2, one begins with the signal 83 then the signal S2 then the signal S1); it will be appreciated that several signals of comparable amplitude could be processed at each iteration. The interactive terrestrial station 106 is also equipped by a modulator/demodulator operating for example according to an asynchronous multiple random access protocol with band spreading by modulation of the SPREAD ALOHA type optimised so that the interactive terrestrial station 106 can use the interference elimination system.

The step 207 of demodulation also makes it possible to recover information on the parameters of the transponder 102 of the satellite; these parameters are for example stored in a memory B (step 208).

According to step 209, the demodulated signal is then re-modulated "cleanly" (i.e. without perturbation of the other signals present in the aggregated signal).

According to step 210, certain effects deduced from the parameters (particularly parameters linked to the transponder 102) stored in the memory B are applied to the re-modulated signal. In so far as one is here dealing with a single signal, only the linear effects which are specific to this signal are applied (an accurate image is thus obtained of the processing at the level of the transponder when this signal will be added to the other signals). As an example, the linear effects of the gain response are applied here as a function of the frequency for the signal modulated according to the first protocol (here DVB-S2); in the same way the linear effects of the gain response will be applied as a function of the frequency for the signals modulated according to the second protocol (asynchronous multiple random access protocol with band spreading by modulation of the SPREAD ALOHA type) as the signals are obtained during successive iterations. In fact, the linear effects of the gain response as a function of the frequency, although linear, are different for the high amplitude signals (DVB-S2 signal from the main terrestrial station 103) and for the signals of smaller amplitudes from interactive terrestrial terminals 104.

All the signals obtained during the different successive iterations demodulated then re-modulated and processed (particularly by the linear effects of the gain response as a function of the frequency) are then cumulated in a memory C (step 211).

According to step 212, one applies to the signal obtained during step 211 non-linear effects and certain linear effects deduced from the parameters stored in the memory B. These linear (Doppler effect linked to the satellite) and non-linear effects are those which are common to all the signals such that it is logical to apply them to the cumulative signal rather than to each signal taken in isolation as a function of its amplitude. The non-linear effects introduced during the amplification phase by the transponder are applied here because they are very dependent on the total amplitude of the signal (it is thus desirableto apply these nonlinear effects to the cumulative signal).

The non-linear effects applied during this step 212 are particularly:

the non-linear effects of the amplitude/amplitude AM/AM modulation;

the non-linear effects of the amplitude/phase AM/PM modulation.

The signal thereby obtained including all the linear and non-linear effects applied to the signals already detected and demodulated during step 212 is then stored in a memory D (step 213).

According to step 214, within the sample of the initial aggregated signal stored in the working memory A, the signal stored in the memory D obtained during step 213 is eliminated. A new reprocessed aggregate signal is thereby obtained on which the steps 207 to 214 are going to be reiterated so as to be able to recover signals of smaller amplitude.

It should be noted that step 212 of application of the non-linear effects is still carried out on the cumulative signal (including all of the signals detected and demodulated) and that step 214 of elimination still takes place from the initial aggregated signal.

The iteration of steps 207 to 214 stops when the number of iterations has reached a given threshold value or when a new iteration does not make it possible to detect and demodulate new signals within the reprocessed aggregate signal.

When the iterations are stopped, one passes to the processing of a sample following the sample already processed in the working memory A. In an embodiment, one passes to another sample in a sampling window slightly overlapping the previous window; this is known as sliding window. There will be for example an overlap of the order of 50 to 100 ms for a sample having a width of 400 ms.

Having described and illustrated the principles of the invention with reference to various embodiments, it will be recognized that the various embodiments can be modified in arrangement and detail without departing from such principles. It should be understood that the devices, systems, modules, transmitters, receivers, programs, processes, or methods described herein, and more generally any elements of the structural arrangement, including the elements of the satellite, the main station, the interactive terminal, the non-interactive terminal and the interactive station, described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements and modules of the structural arrangement, including the elements of the satellite, the main station, the interactive terminal, the non-interactive terminal and the interactive station, described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processor to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor for execution.

Computer programs comprising machine executable instructions for implementing at least one of the steps of the method described herein or function(s) of various elements of the structural arrangement, including the elements of the satellite, the main station, the interactive terminal, the non-interactive terminal and the interactive station, described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above and currently faced by satellite designers.

The invention claimed is:

1. A method for establishing radio frequency links in a telecommunication network including:
　a telecommunication satellite comprising a transponder for a reception of signals situated in a determined uplink frequency range within an uplink frequencies of a use band, wherein amplification of said signals, frequency conversion of said signals and transmission, to a receiver on earth, of said signals are situated in a determined downlink frequency range within a downlink frequencies of use band;
　a main terrestrial station comprising a broadcasting system to broadcast, to said telecommunication satellite signals, modulated according to a first protocol and occupying at least one portion of said determined uplink frequency range;
　a plurality of interactive terminals, each of said interactive terminals comprising a receiver to receive the signals transmitted, by said transponder, from said main terrestrial station, and a transmitter to transmit to said telecommunication satellite signals modulated according to a second protocol and occupying at least one part of said portion of said uplink frequency range, said second protocol being different from the first protocol and being a spread spectrum protocol;
　an interactive terrestrial station comprising a receiver to receive the signals transmitted by said transponder from the interactive terminals and from the main terrestrial station;
　said method comprising:
　　transmitting by said main terrestrial station a signal modulated according to the first protocol and occupying said portion of the uplink frequency range;
　　transmitting by said interactive terminals a plurality of signals modulated according to the second protocol and occupying at least one part of said portion of said uplink frequency range wherein said plurality of signals is frequency superimposed on the signal broadcast by said main terrestrial station;
　　receiving by said telecommunication satellite said signals modulated according to the second protocol and said signal modulated according to the first protocol, said signals modulated according to the second protocol being received by said telecommunication satellite with a total amplitude less than the amplitude of the signal broadcast by said main terrestrial station and said signals modulated according to the second protocol being received by said telecommunication satellite with different amplitudes;
　　passing said signals modulated according to the second protocol and said signal modulated according to the first protocol within said transponder, all of said signals being amplified with non-linear effects by said transponder;
　　transmitting by said telecommunication satellite to a receiver on earth an aggregated signal comprising said signals modulated according to the second protocol and said signal modulated according to the first protocol amplified by said transponder;
　　receiving by said interactive terminals said aggregated signal and demodulating the signal transmitted by the main terrestrial station modulated according to the first protocol;
　　receiving by said interactive terrestrial station said aggregated signal that forms an initial aggregated signal;
　　eliminating, by said interactive terrestrial station, within said initial aggregated signal said signal modulated according to the first protocol such that a reprocessed aggregate signal is obtained;
　said method further comprising:
　　a step i) of demodulating by said interactive terrestrial station, from said reprocessed aggregate signal, the signals modulated according to the second protocol having the highest amplitude among all of the signals modulated according to the second protocol present in the reprocessed aggregate signal;
　　a step ii) of re-modulating according to said second protocol by said interactive terrestrial station said signals demodulated at the demodulating;
　　a step iii) of generating by said interactive terrestrial station a signal including said signal modulated according to the first protocol and said signals re-modulated according to the second protocol to which are applied linear and nonlinear effects of the amplification of the transponder;
　　a step iv) of eliminating, within said initial aggregated signal, said signal simulated during the generating step such that a new reprocessed aggregate signal is obtained; and
　　steps i) to iv) being reiterated on the new reprocessed aggregate signal, so that the level of interference within the reprocessed aggregate signal is reduced at each iteration.

2. The method according to claim 1, wherein said telecommunication network comprises a plurality of non-interactive, uniquely reception terminals, each of said non-interactive terminals comprising a receiver to receive the signals transmitted by said transponder from said main terrestrial station, said method further comprising receiving by said non-interactive terminals of said aggregated signal and demodulating the signal transmitted by the main terrestrial station modulated according to the first protocol.

3. The method according to claim 2, wherein some of said plurality of non-interactive terminals are already installed and operational before commissioning of the interactive terminals.

4. The method according to claim 1, wherein said second protocol is an asynchronous or synchronous multiple random access protocol.

5. The method according to claim 1, wherein said first protocol is implemented according to one of the following standards:
　DVB-S;
　DVB-S2;
　DVB-SH.

6. The method according to claim 1, wherein said uplink frequencies of use band belongs to the Ku band or to the Ka band.

7. The method according to claim 1, wherein said main terrestrial station is located in a different place to said interactive terrestrial station.

8. The method according to claim 1, wherein the linear and nonlinear effects of the amplification of the transponder of step iii) include one or more of the following effects:

non-linear effect of the amplitude/amplitude AM/AM modulation;

non-linear effect of the amplitude/phase AM/PM modulation;

linear effect of the gain response as a function of the frequency for the signal modulated according to the first protocol;

linear effect of the gain response as a function of the frequency for the signals modulated according to the second protocol.

9. The method according to claim 1, further comprising sending by said main terrestrial station a signalling information to said interactive terminals.

10. The method according to claim 9, wherein the sending of said signaling information consists of informing said interactive terminals of a level or of a range of levels of transmission powers to use.

11. The method according to claim 1, wherein the iteration process stops when the number of iterations has reached a given threshold value or when a new iteration does not make it possible to detect and demodulate new signals within said reprocessed aggregate signal.

12. The method according to claim 1, wherein the aggregated signal received is sampled, said samples being memorised in a memory space, and the operations of elimination of the detected and demodulated signals being carried out by modifying successively the content of said memory space at each stoppage of the iterative process.

13. The method according to claim 1, wherein said step of eliminating by said interactive terrestrial station of said signal modulated according to the first protocol comprises:

demodulating by said interactive terrestrial station, from said aggregated signal, the signal modulated according to the first protocol;

re-modulating according to said first protocol by said interactive terrestrial station said signal demodulated at the modulating;

generating by said interactive terrestrial station a signal including said signal re-modulated according to the first protocol to which are applied the linear and non-linear effects of the amplification of the transponder; and eliminating within said initial aggregated signal of said signal simulated during the generating such that said reprocessed aggregate signal is obtained.

14. A telecommunication network for implementing the method according to claim 1, comprising:

a telecommunication satellite comprising a transponder for the reception of signals situated in a determined uplink frequency range within an uplink frequencies of use band, the amplification of said signals, the frequency conversion of said signals and the transmission to the earth of said signals situated in a determined downlink frequency range within a downlink frequencies of use band;

a main terrestrial station comprising a broadcasting system to broadcast to said telecommunication satellite signals modulated according to a first protocol and occupying at least one portion of said uplink frequency range;

a plurality of interactive terminals, each of said interactive terminals comprising receiver to receive the signals transmitted by said transponder from said main terrestrial station, and a transmitter to transmit to said telecommunication satellite signals modulated according to a second protocol and occupying at least one part of said portion of said uplink frequency range such that said plurality of signals is frequency superimposed on the signal broadcast by said terrestrial station, said second protocol being different to the first protocol and being a spread spectrum protocol, said signals modulated according to the second protocol being received by said telecommunication satellite with a total amplitude less than the amplitude of the signal broadcast by said main terrestrial station and said signals modulated according to the second protocol being received by said telecommunication satellite with different amplitudes;

an interactive terrestrial station comprising a receiver to receive the signals transmitted by said transponder from the interactive terminals and from the main terrestrial station;

wherein said telecommunication satellite further comprises a transmitter to transmit to the earth of an aggregated signal comprising said signals modulated according to the second protocol and said signal modulated according to the first protocol amplified by said transponder;

wherein said interactive terminals comprise receivers to receive said aggregated signal and to demodulate the signal transmitted by the main terrestrial station modulated according to the first protocol;

wherein said interactive terrestrial station further comprises:

a receiver to receive said aggregated signal that forms an initial aggregated signal;

a processing device to eliminate within said initial aggregated signal said signal modulated according to the first protocol such that a reprocessed aggregate signal is obtained;

a demodulator to demodulate, from said reprocessed aggregate signal, signals modulated according to the second protocol having the greatest amplitude among all of the signals modulated according to the second protocol present in the reprocessed aggregate signal;

a re-modulator to re-modulate according to said second protocol of said demodulated signals;

a signal generator to generate a signal including said signal modulated according to the first protocol and said signals re-modulated according to the second protocol to which are applied the linear and non-linear effects of the amplification of the transponder;

a processing device to eliminate within said initial aggregated signal said simulated signal such that a new reprocessed aggregate signal is obtained.

* * * * *